United States Patent [19]

Donohue et al.

[11] E Re. 29,514

[45] Reissued Jan. 10, 1978

[54] PROGRAMMING CONTROL SYSTEM FOR PRINTING MACHINE

[75] Inventors: James M. Donohue, Los Alamitos, Calif.; Daniel L. Mueller, Fairport, N.Y.

[73] Assignee: Xerox Corporation, Stamford, Conn.

[21] Appl. No.: 606,155

[22] Filed: Aug. 20, 1975

Related U.S. Patent Documents

Reissue of:

[64] Patent No.: 3,796,486
Issued: Mar. 12, 1974
Appl. No.: 244,734
Filed: Apr. 17, 1972

U.S. Applications:

[63] Continuation of Ser. No. 97,745, Dec. 14, 1970, abandoned.

[51] Int. Cl.[2] ..... G03G 15/00

[52] U.S. Cl. ..... 355/16; 355/3 R; 355/14

[58] Field of Search ..... 355/14, 16, 17, 3 R, 355/3 BE, 3 TR

[56] References Cited

U.S. PATENT DOCUMENTS

| | | | |
|---|---|---|---|
| 2,736,770 | 2/1956 | McNaney | 178/15 |
| 3,090,616 | 5/1963 | Eichler et al. | 271/3 |
| 3,450,995 | 6/1969 | Hirsch | 355/14 UX |
| 3,524,528 | 8/1970 | Peyton | 197/133 |
| 3,602,589 | 8/1971 | Dietz | 355/14 |
| 3,606,532 | 9/1971 | Shelffo et al. | 355/16 X |
| 3,659,109 | 4/1972 | Hickey et al. | 355/14 X |
| 3,700,906 | 10/1972 | Hickey | 250/208 |
| 3,724,943 | 4/1973 | Draueelis et al. | 355/4 |
| 3,744,900 | 7/1973 | Reesen | 355/16 |

*Primary Examiner*—L. T. Hix
*Assistant Examiner*—J. A. Labarre

[57] ABSTRACT

A programming control system for controlling the processing steps of an electrostatic printing machine of the type employing an endless photoreceptor belt. A photoreceptor speed sensitive element in the form of a transfer roller is utilized for resetting on *a* complete machine timing cycle of processing operation. This cycle, called pitch is applied to the belt and comprises a predetermined number of electrical pulses some of which control machine events.

12 Claims, 1 Drawing Figure

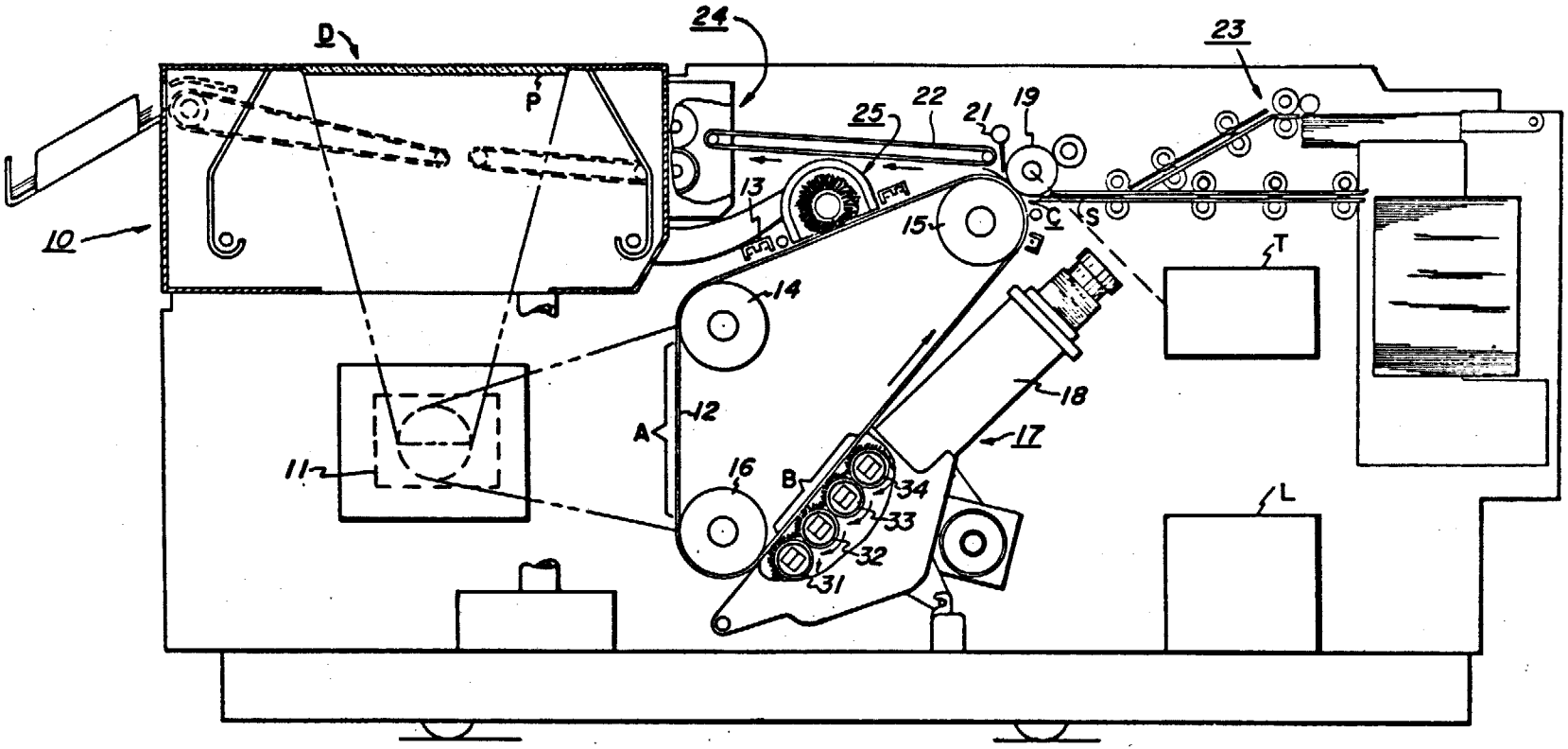
23
24
25
22
21
19
S
C
E
T
L
18
17
15
14
13
12
16
A
B
34
33
32
31
P
D
11
10

PROGRAMMING CONTROL SYSTEM FOR PRINTING MACHINE

Matter enclosed in heavy brackets [ ] appears in the original patent but forms no part of this reissue specification; matter printed in italics indicates the additions made by reissue.

This is a continuation, of application Ser. No. 97,745, filed 12/14/70, now abandoned.

This invention relates to electrostatic printing machines, and in particular, to a unique configuration of an endless photoreceptor belt with a speed responsive element in the form of a transfer roller, and the application of a programmed time sequence to the processing stations.

Electrostatic printing machines of the endless belt type employ various processing stations which will uniformly charge, expose, develop, transfer, clean, etc. during any cycle of copying. For high speed operation of these machines, it becomes very important that there be a proper base for the timing sequence of operation of the processing stations in order to maintain paper registration of all the processing functions relative to images. There must be provision for the efficient and assured movement of sheets of copy paper to the transfer station of the machine in timed sequence relative to the production of electrostatic latent images, the proper orientation of each sheet of the developed image received at the transfer station, the assured removal or release of each sheet at a precise time in order to effect continued movement of each sheet for further processing thereof, and paper jam detection.

Therefore, the principal object of the present invention is to improve electrostatic printing machines of the type employing electrostatic photoreceptor belts.

Another object of the present invention is to maintain proper timing of the operation of the electrostatic processing stations utilized in the machine so as to effect maximum efficiency in the operation of the machine especially for high speed reproduction.

The foregoing objects are attained by the timed sequence of operation of certain processing stations, based upon the speed of the photoreceptor belt which is sensed by a speed responsive element preferably in the form of the transfer roller for the machine. Machine processing is accomplished by utilizing a timing device which generates continuous cycling of a series of electrical pulses, some of which are used to initiate operation of the processing components in the machine. The photoreceptor speed sensitive roller for this programming control is utilized to directly relate the belt speed and positioning during movement thereof to generation of the pulses and the resetting of each cycle. Resetting is accomplished for each sheet of paper and one spacing between it and the next sheet, or the time between the exposure flashes by the machine.

These and other objects will become apparent after reading the following specification in conjunction with the drawing, wherein there is shown a schematic sectional view of an electrostatic reproduction machine embodying the principles of the invention.

For a general understanding of an electrostatic processing system in which the invention may be incorporated, reference is had to FIG. 1 in which various components of a system are schematically illustrated. As in all electrostatic systems such as a xerographic machine of the type illustrated, a light image of an original to be reproduced is projected onto the sensitized surface of a xerographic plate to form an electrostatic latent image thereon. Thereafter, the latent image is developed with an oppositely charged developing material comprising carrier beads and smaller toner particles triboelectrically adhering thereto to form a xerographic powder image, corresponding to the latent image on the plate surface. The powder image is then electrostatically transferred to a support surface to which it may be fixed by a fusing device whereby the powder image is caused permanently to adhere to the support surface.

The electrostatically attractable developing material commonly used in magnetic brush developing apparatus comprises a pigmented resinous powder referred to here as "toner" and a "carrier" of larger granular beads formed with steel cores coated with a material removed in the triboelectric series from the toner so that a triboelectric charge is generated between the toner powder and the granular carrier. The magnetizable carrier also provides mechanical control for the formation of brush bristles by virtue of magnetic fields so that the toner can be readily handled and brought into contact with the exposed xerographic surface. The toner is then attracted to the electrostatic latent image from the carrier bristles to produce a visible powder image on an insulating surface.

In the illustrated machine, an original D to be copied is placed upon a transparent support platen P fixedly arranged in an illumination assembly generally indicated by the reference numeral 10. While upon the platen, an illumination system flashes light rays upon the original thereby producing image rays corresponding to the informational areas on the original. The image rays are projected by means of an optical system 11 to an exposure station A for exposing the photosensitive surface of a moving xerographic plate in the form of a flexible photoconductive belt 12. In moving in the direction indicated by the arrow, prior to reaching the exposure station A, that portion of the belt being exposed would have been uniformly charged by a corona device 13 located at a belt run extending between belt supporting rollers 14 and 15. The exposure station extends between the roller 14 and a third support roller 16, and the belt run between these rollers is encompassed entirely by the exposure station for minimizing the space needed for the belt and its supporting rollers.

The exposure of the belt surface to the light image discharges the photoconductive layer in the areas struck by light, whereby there remains on the belt a latent electrostatic image in image configuration corresponding to the light image projected from the original on the supporting platen. As the belt surface continues its movement, the electrostatic image passes around the roller 16 and through a developing station B located at a third run of the belt and in which there is positioned a developing apparatus generally indicated by the reference numeral 17. Suitable means (not shown) such as, vacuum panels or tensioning means may be utilized for maintaining the belt flat in all three belt runs, and additionally the belt run related to the development zone B is maintained at an inclined plane. The developing apparatus 17 comprises a plurality of magnetic brushes *31, 32, 33, 34* which carry developing material to the adjacent surface of the upwardly moving inclined photoconductive belt 12 in order to provide development of the electrostatic image.

As the developing material is applied to the xerographic belt, toner particles in the development material are attracted electrostatically to the belt surface to form powder images. As toner powder images are formed additional toner particles are supplied to the developing material in proportion to the amount of toner deposited on the belt during xerographic processing. For this purpose, a toner dispenser generally indicated by reference numeral 18 is used to accurately meter toner, upon demand, to the developer material in the developing apparatus 17.

The developed electrostatic image is transported by the belt 12 to a transfer station C located at a point of tangency on the belt as it moves around the roller 15 whereat a sheet of copy paper is moved at a speed in synchronism with the moving belt in order to accomplish transfer of the developer image. There is provided at this station a transfer roller 19 which is arranged on the frame of the machine for contacting the non-transfer side of each sheet of copy paper as the same is brought into transfer engagement with the belt 12. The roller 19 is electrically biased with sufficient voltage so that a developed image on the belt 12 may be electrostatically transferred to the adjacent side of a sheet of paper S as the same is brought into contact therewith, and also for tacking the same on the roller 19. A stripping finger or air puffing device 21 utilized for stripping the sheet from the roller is provided to permit pick-up and continued movement of the sheet by a vacuum conveying system 22. In tacking on the roller 19, each sheet of paper travels only a short distance before being stripped therefrom by the stripper 21. Devices such as gripper bars and release elements mounted on the roller 19 may be utilized instead of the stripper 21 for gripping the leading edge of each sheet of copy paper to ensure proper positioning thereon and to effect the release of a copy sheet at a precise time so as to strip the same for pick-up by a conveying system. The timing of the release of each edge relative to the sheet separation from the supply stack of sheets may be for the same period of time.

There is also provided a suitable sheet transport mechanism adapted to transport sheet of paper seriatim from a paper handling mechanism generally indicated by the reference numeral 23 to the developed image on the belt as the same is carried around the roller 15. A programming device operatively connected to the mechanism 23, the stripper device 21 and the illumination device for producing an electrostatic latent image on the belt 12 is effective to present a developed image at the transfer station C in timed sequence with the arrival of a sheet of paper and being coordinated with the activation of the stripper 21 at the precise time that these elements are to function for their intended purpose.

Programming control for the machine processing steps is acquired by utilizing pitch reset timing wherein a series of electrical pulses are generated per copy, say on the order of 1,000 pulses per copy, and reset of this number, or pitch, is accomplished when this number of pulses is attained. Since the belt 12 may slip on its supporting rollers during high speed use, or the belt may have an undesirable transverse seam, it is preferred that pitch reset be directly related to the belt. This is accomplished by utilizing the transfer roller 19 which is directly applied to the belt and moves at all times directly therewith, and a reset mechanism which is reset for each revolution of the roller. Any other photoreceptor speed sensitive element other than the transfer roller may be utilized.

The programming control is acquired by means of a timing device T mechanically coupled to the shaft for the roller 19 and which is driven into operation when the roller is rotating. The timing device is set to complete a predetermined number of time pulses, as described above, and any machine event or processing step can be set to occur on any discrete pulse. In the alternative, incremental timing or pulse generation can be taken off the drive motor utilized to drive the roller [22] *15* and the belt 12, and reset can be accomplished by the rotation of the roller 19 at each revolution thereof. In the illustrated arrangement, a sequence of some operations of the machine processing devices occurs for each revolution of the roller 19 so that after each revolution of the roller, the timing device will be automatically reset back to zero time for the commencement of another time sequence of operations. With the [diameter] *circumference* of the roller 19 being dimensioned so as to be slightly greater than the width of a sheet of paper being applied thereto, in order to provide for the sheet width and desired spacing between sheets, the application of each sheet to the roller at precisely the same position for all sheets, may be utilized as the point of start, or zero time, for each timing cycle. If another diameter is utilized for the roller 19, the circumference must be factored into the pitch length so that reset is accomplished in the space equal to the width of a sheet of copy paper plus a spacing distance between sheets, or the time between illumination flashes. Logic equipment, illustrated by the letter L is operatively connected to the timing device, the paper sheet handling mechanism 23, the illumination system 10, and the stripping device 21, and arranged so that these devices are functionally activated and controlled by the timing device T in time sequence. Since the photoreceptor belt 12 is continuously being exposed by flashing imaging rays, it may contain a number of electrostatic latent images, for example, five or more images between the exposure and transfer stations. Similarly, the paper path between the paper handling apparatus 23 and the transfer station may contain three or more sheets. Any particular time cycle made operative by the timing device T may then produce sequential operation of the above-mentioned devices in an order which affects different images, transfer operation and sheets of paper. In other words, the programming control system will maintain timing control for five or more pitches concurrently processwise. For instance, starting from zero time, the stripper 21 may be activated to de-tack the leading edge of a sheet of paper [to] *from* the roller 19, this sheet having been previously separated from the paper supply stack during a previous cycle. The next operation in time may involve a "flash" exposure of the belt at the exposure station. The developed image being transferred commencing at the zero time of the present cycle may have had its exposure some five timing cycles previously. As the present timing cycle continues, the stripping device 21 may be activated again so as to strip the leading edge of another sheet away from the roller 19. As this roller continues to rotate so as to maintain the operation of the timing device T, other devices may be activated to continue the processing of reproductions. For example, a plurality of paper jam detection devices (not shown) located along the paper path of movement may be sensed in sequence for the different sheets of paper in the path in order to insure the [paper] *proper* positioning of the sheets. Upon release of the sheet of paper from the roller 19 placed there at the commencement of the present timing cycle, the cycle begins again and will produce the identical series of operations as discussed above.

After the sheet is stripped from the belt 12, it is conveyed by the conveying system 22 into a fuser assembly generally indicated by the reference numeral 24 wherein the developed and transferred xerographic powder image on the sheet material is permanently affixed thereto. After fusing, the finished copy is discharged from the apparatus at a suitable point for collection externally of the apparatus. The remaining toner particles remaining as residue on the developed images, background particles and those particles otherwise not transferred are carried by the belt 12 to a cleaning apparatus 25 positioned on the run of the belt between the rollers 14, 15 adjacent the charging device 13. The cleaning device comprises a rotating brush, a corotron for neutralizing charges remaining on the particles and discharge lamp for discharging any remaining electrostatic charges on the belt. It will be appreciated that the run of the belt adjacent the cleaning device is at an incline angle relative to the horizontal as this run leaves the uppermost roller 15 where a developed image is transferred. Such an arrangement maintains the relatively straight line of copy sheet movement which operatively cooperates with the printing belt 12 at its highest point.

From the foregoing it will be apparent that the configuration and positioning of the processing devices for electrostatic reproductions and the inclined angles of two of the runs are such as to utilize fully all three runs of the photoconductive belt 12 so as to minimize its size as well as to optimize efficiency and the utilization of machine space. The arrangement also results in a machine which has a height that is ideal for operator that is, waist high, especially in the provision of a paper path of movement above the image processing apparatus. In this manner paper jams can be attended to easily, without dismantling or involvement with other apparatus in the machine, and without having to resort to activities in the vicinity of the floor supporting the machine or the lower regions thereof.

While the invention has been described with reference to the structure disclosed, it is not confined to the details set forth, but is intended to cover such modifications or changes as may come within the scope of the following claims.

What is claimed is:

1. An electrostatic printing apparatus for reproducing copies of an original having [an endless] *a* movable photoreceptor [belt] including, means for producing electrostatic latent images on said [belt] *photoreceptor,* development means for applying developing material to each of the latent images to develop the same, transfer station adjacent the moving [belt] *photoreceptor,* means for feeding seriatim sheets of copy material at the rate of one sheet per actuation thereof from a supply thereof and to said transfer station at which each developed image is transferred to said sheets, programming means associated with said image producing means and said sheet feeding means and operative when activated for controlling actuation of the latter [in time sequence] relative *to* the production of each latent image by said image producing means, said programming means including means for effecting the activation [thereof] *of said feeding means* once in each of predetermined timed cycles, and means responsive to the speed of movement of the [belt] *photoreceptor* for resetting said time cycle.

2. An electrostatic printing apparatus for reproducing copies of an original having [an endless] *a* movable photoreceptor [belt] including, means for producing electrostatic latent images on said [belt] *photoreceptor,* development means for applying developing material to each of the latent images to develop the same, transfer station adjacent the moving [belt] *photoreceptor,* means for feeding seriatim sheets of copy material at the rate of one sheet per actuation thereof from a supply thereof and to said transfer station at which each developed image is transferred to said sheets, means for generating in equal cycles series of control pulses, said generating means including means associated with said image producing means and said sheet feeding means for controlling actuation of the latter in timed sequence relative the production of each latent image by said image producing means for each of said cycles, and means responsive to the speed of movement of the [belt] *photoreceptor* for resetting each of said timed cycles.

3. The apparatus of claim 2 wherein said generating means is a timing device.

4. An electrostatic printing apparatus for reproducing copies of an original having an endless movable photoreceptor belt including, means for producing electrostatic latent images on said belt, development means for applying developing material to each of the latent images to develop the same, transfer station adjacent the moving belt, means for feeding seriatim sheets of copy material at the rate of one sheet per actuation thereof from a supply thereof and to said transfer station at which each developed image is transferred to said sheets, means for generating in equal cycles series of control pulses, said generating means including means associated with said image producing means and said sheet feeding means for controlling actuation of the latter in timed sequence relative the production of each latent image by said image producing means for each of said cycles, a transfer roller adjacent the transfer station for supporting each sheet of material in contact with the belt during transfer of developed images, said roller having a peripheral rotative speed equal to the speed of movement of the belt, said generating means being operatively connected to said roller for producing operation of the former during rotation of the latter.

5. An electrostatic printing apparatus for reproducing copies of an original having an endless movable photoreceptor belt including, means for producing electrostatic latent images on said belt, development means for applying developing material to each of the latent images to develop the same, transfer station adjacent the moving belt, means for feeding seriatim sheets of copy material at the rate of one sheet per actuation thereof from a supply thereof and to said transfer station at which each developed image is transferred to said sheets, means for generating in equal cycles series of control pulses, said generating means including means associated with said image producing means for controlling actuation of the same at the rate of one image producing operation in each series of generated pulses, and means responsive to the speed of movement of the belt for resetting each of said time cycles.

6. An electrostatic printing apparatus for reproducing copies of an original having an endless movable photoreceptor belt including, means for producing electrostatic latent images on said belt, development means for applying developing material to each of the latent images to develop the same, transfer station adjacent the moving belt, means for feeding seriatim sheets of copy material at the rate of one sheet per actuation thereof from a supply thereof and to said transfer station at which each developed image is transferred to said sheets, programming means associated with said image producing means and said sheet feeding means and operative when activated for controlling actuation of the latter in timed sequence relative the production of each latent image by said image producing means, said programming means including means for effecting the activation thereof once in each of predetermined timed cycles, and means responsive to the distance of movement of the belt for resetting said time cycle.

7. An electrostatic printing apparatus for reproducing copies of an original having [an endless] *a* movable photoreceptor [belt] and a plurality of processing devices arranged when activated for producing electrostatic latent images on the [belt] *photoreceptor*, for developing the images and for transferring developed images to moving support material, and drive means operatively connected to the [belt] *photoreceptor* for driving the same [in the endless path,] the improvement comprising, means for generating a series of control signals, said generating means including an element drivingly connected with the [belt] drive means to be driven thereby for its generating operation, and means responsive to the control signals for controlling activation of at least one of the processing devices.

8. An electrostatic printing apparatus for reproducing copies of an original having an endless movable photoreceptor belt and a plurality of processing devices arranged when activated for producing electrostatic latent images on the belt, for developing the images for feeding sheets seriatim, and for transferring developed images to the moving support material, and drive means operatively connected to the belt for driving the same in the endless path, the improvement comprising, means for generating a series of control pulses, said generating means including an element drivingly connected with the belt drive means, and means responsive to different predetermined numbers of the control pulses for controlling activation of some of the processing devices.

9. An electrostatic printing apparatus for reproducing copies of an original having an endless movable photoreceptor belt and a plurality of processing devices arranged when activated for producing electrostatic latent images on the belt, for developing the images, for feeding sheets seriatim, and for transferring developed images to the moving support material, and drive means operatively connected to the belt for driving the same in the endless path, the improvement comprising, means for generating a series of control pulses, said generating means including an element drivingly connected with the belt drive means, and means responsive to a predetermined number of the control pulses for initiating activation of at least one of the processing devices.

*10. An electrostatic printing apparatus for reproducing copies of an original having an endless movable photoreceptor belt including,*

*means for producing electrostatic latent images on said belt,*

*development means for applying developing material to each of the latent images to develop the same,*

*transfer station adjacent the moving belt,*

*means for feeding copy material from a supply thereof to said transfer station at which each developed image is transferred to said copy material,*

*programming means associated with said image producing means and said feeding means and operative when activated for controlling actuation of the latter in timed sequence relative to the production of each latent image by said image producing means, said programming means including means for effecting the activation of said feeding means once in each of predetermined time cycles, and*

*means responsive to the speed of movement of the belt for resetting said time cycle.*

*11. An electrostatic printing apparatus for reproducing copies of an original having a movable photoreceptor and a plurality of processing devices arranged when activated to produce electrostatic latent images on the photoreceptor, for developing the images for feeding sheets seriatim, and for transferring developed images to the sheets, and drive means operatively connected to the photoreceptor for driving the same in an endless path, the improvement comprising:*

*means for generaing a continuous series of pulses;*

*means to periodically reset said pulses to zero to form pitches, each of said pitches comprising a group of said pulses; and*

*control means for activating said machine processing devices in time sequence relative to discrete ones of said pulses including*

*means for maintaining timing control of said processing devices in accordance with multiple ones of said pitches concurrently whereby timing control is maintained for processing a sequence of copies simultaneously.*

*12. The printing apparatus according to claim 11, in which said reset means is adapted to reset said pulses to zero in accordance with at least a dimension of a sheet.*

* * * * *